(12) United States Patent
Nishimura et al.

(10) Patent No.: US 6,804,205 B1
(45) Date of Patent: Oct. 12, 2004

(54) METHOD AND APPARATUS FOR TRANSMITTING PACKET FOR SYNCHRONIZATION USING HALF DUPLEX TRANSMISSION MEDIUM

(75) Inventors: Takashi Nishimura, Tenri (JP); Yuji Ichikawa, Tenri (JP); Daisuke Nakano, Tenri (JP); Kazuyuki Sumi, Nara (JP); Toru Ueda, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/578,690

(22) Filed: May 26, 2000

(30) Foreign Application Priority Data

May 28, 1999 (JP) .......................................... 11-149111

(51) Int. Cl.$^7$ ............................. H04L 5/16; H04L 12/28; G06F 15/16
(52) U.S. Cl. ............... 370/296; 370/395.4; 370/395.62; 370/421; 709/242; 710/117
(58) Field of Search .................................. 370/389, 279, 370/282, 293, 296, 395.1, 396, 395.21, 395.3, 395.4, 395.43, 395.51, 395.62, 395.63, 395.7, 401, 421, 417; 709/236, 238, 242; 710/100, 105, 112, 117

(56) References Cited

U.S. PATENT DOCUMENTS

| | | | | |
|---|---|---|---|---|
| 4,079,188 A | * | 3/1978 | Kinch et al. ................. 380/259 |
| 5,634,196 A | * | 5/1997 | Alford ......................... 455/18 |
| 6,128,654 A | * | 10/2000 | Runaldue et al. ........... 709/219 |
| 6,192,028 B1 | * | 2/2001 | Simmons et al. ........... 370/229 |
| 6,563,804 B1 | * | 5/2003 | Iyer et al. ................... 370/296 |
| 6,634,196 B2 | * | 10/2003 | Huang ......................... 70/224 |

OTHER PUBLICATIONS

The Institute of Electrical And Electronics Engineers, Inc., P1394a Draft Standard for a High Performance Serial Bus (Supplement), p.ii & p. 136 (Sep. 8, 1999).
The Institute of Electrical And Electronics Engineers, Inc., P1394.1 Draft Standard for a High Performance Serial Bus Bridges, p.ii & p. 17 (Oct. 7, 1999).

* cited by examiner

*Primary Examiner*—Afsar M. Qureshi
(74) *Attorney, Agent, or Firm*—Birch, Stewart, Kolasch & Birch, LLP

(57) ABSTRACT

A method of half duplex transmission of a packetized digital data includes the steps of inputting a new packet to be transmitted to a first-in-first-out storage, determining whether the new packet contains time information related to synchronization with other electronic device, responsive to the determination that the new packet contains time information, updating a local timer of the electronic device with a prescribed value, continuously incrementing the local timer, responsive to a timing enabling transmission of the new packet by the transmitting/receiving unit of the electronic device, reading the new packet from the first-in-first-out storage, determining whether the new packet contains time information or not, changing the time information by using a value of the local timer to prevent mismatch in synchronization with other electronic device, and outputting to the bus through the transmitting/receiving unit.

19 Claims, 15 Drawing Sheets

FIG.2 PRIOR ART

| second_count | cycle_count | cycle_offset |
|---|---|---|
| 7 | 13 | 12 |

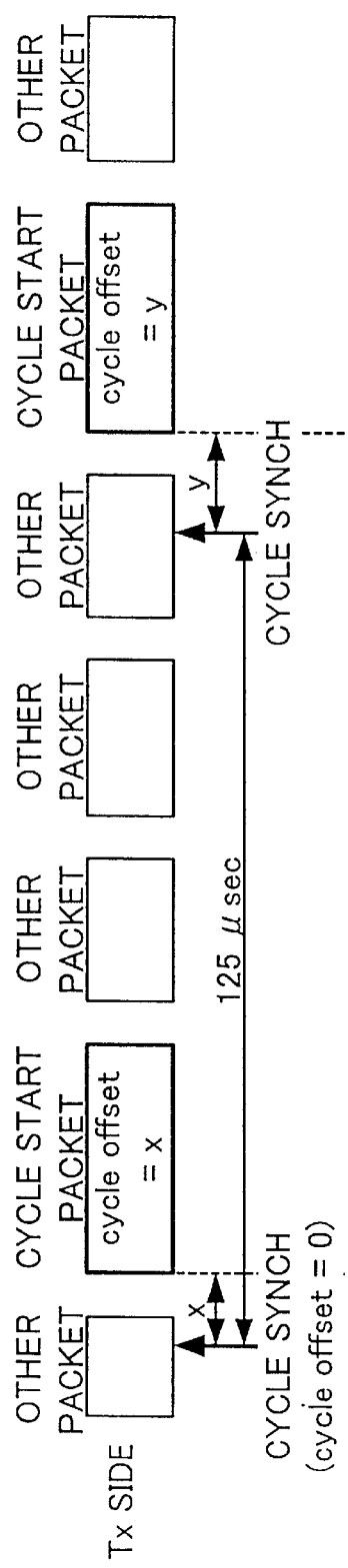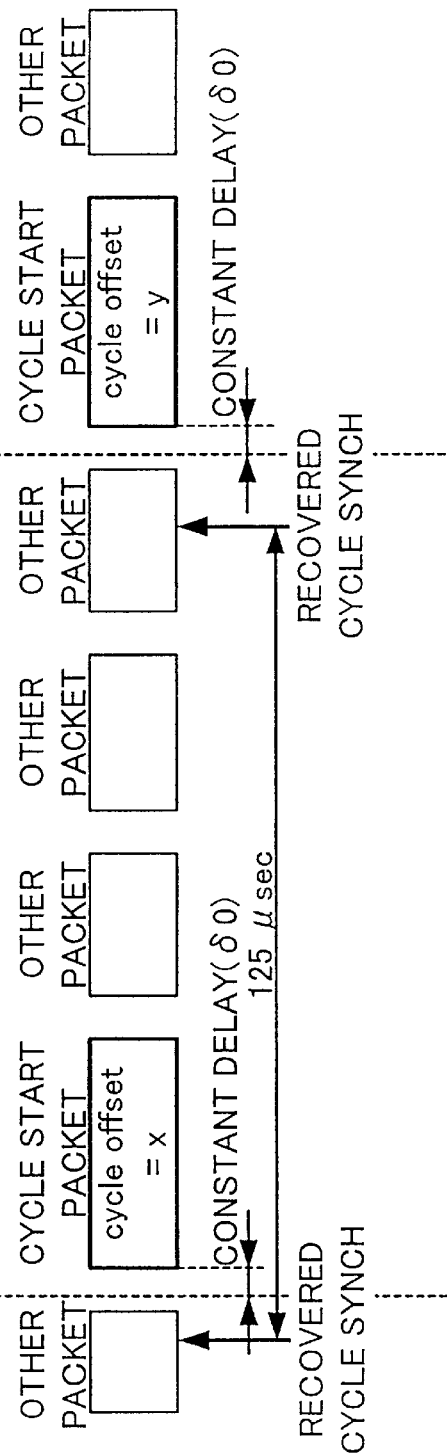
FIG. 6 PRIOR ART
Tx SIDE
FIG. 7 PRIOR ART
Rx SIDE (IEEE1394)

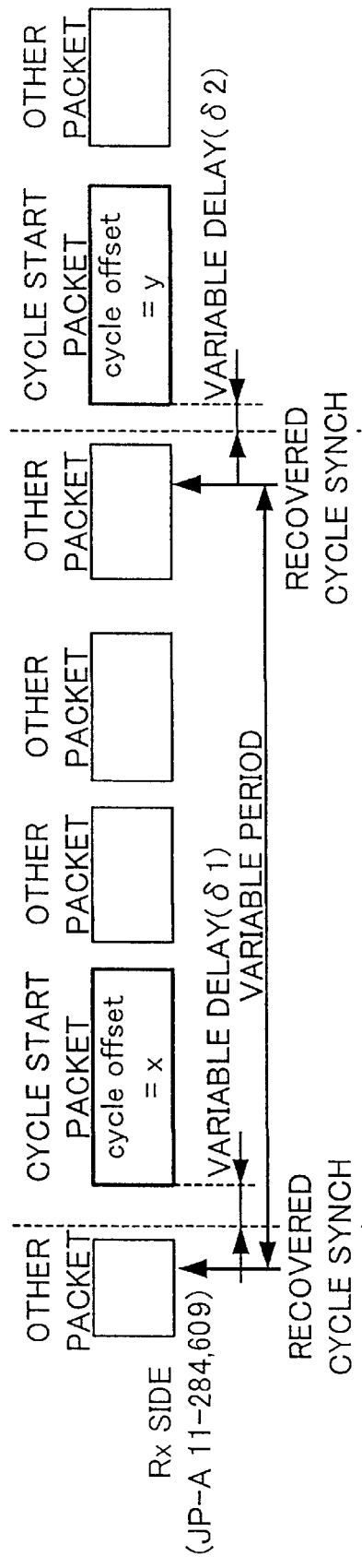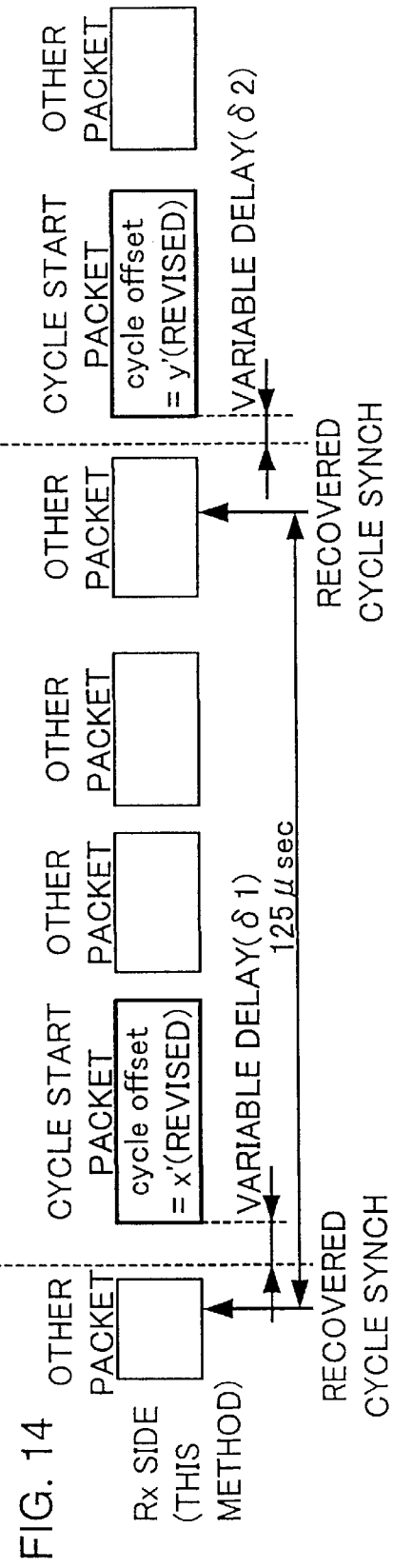

METHOD AND APPARATUS FOR TRANSMITTING PACKET FOR SYNCHRONIZATION USING HALF DUPLEX TRANSMISSION MEDIUM

BACKGROUND OF THE INVENTION

1. Field of the Invention

The present invention relates to method and apparatus for synchronization when signals in accordance with IEEE (Institute of Electrical and Electronics Engineers) 1394 are transmitted over a medium of half duplex transmission.

2. Description of the Background Art

Standards and draft standards such as high performance serial bus IEEE Std 1394-1995 (and P1394a and P1394b proposed as additional specification thereof) have been known as prior art techniques of this field. In such (draft) standards, nodes connected to a bus are synchronized by providing a packet for synchronization, which is called a cycle start packet, over the bus once at every 125 micro seconds.

The cycle start packets are transmitted by a node called a cycle master node, which has a cycle timer register serving as a reference for synchronization.

FIG. 1 represents a format of the cycle start packet. Referring to FIG. 1, a cycle start packet consists of a total of 160 bits. FIG. 1 represents the 160 bits in the form of 32 bits×5 stages. The cycle start packet includes, in the order of transmission, the first field of 16 bits representing a packet destination nodes; the second field of 8 bits; the third field of 4 bits representing the type of the packet; the fourth field of 4 bits representing packet priority; the fifth field of 16 bits representing a transmission node; the sixth field of 48 bits representing a destination address; the seventh field of 32 bits representing a value of the cycle time register at the cycle master node at the time of packet transmission; and the eighth field of 32 bits storing a CRC (Cyclic Redundancy Check) code for validating whether the contents of the packet are correct.

The value of the first field is "FFFF" in hexadecimal notation, representing that the packet is a broadcast packet. The "broadcast packet" refers to a packet which is addressed to all the nodes connected to the bus.

The value stored in the second field is, for the cycle start packet, always "00" in hexadecimal notation.

The third field stores the value of "8" in hexadecimal notation ("1000" in binary notation) for the cycle start packet.

The value stored in the fourth field is, for the cycle start packet, always the value representing the highest priority ("FFFF" in hexadecimal notation).

The fifth field stores a value representing a transmission node of the cycle start packet.

The sixth field stores, for the cycle start packet, an address of the cycle timer register holding time information at each node ("FFFFF0000200" in hexadecimal notation).

The contents related to the value of the cycle time register stored in the seventh field will be described later.

FIG. 2 represents the configuration of the cycle time register described above. The cycle time register is a 32-bit register, which is used divided into "second_count" of 7 bits, "cycle_count" of 13 bits and "cycle_offset" of 12 bits.

"Second_count" is a field representing seconds, which is incremented by a carry of "cycle_count", which will be described later.

"Cycle_count" is a field representing a number of cycles each equal to one 8000th of a second. This field is incremented by a carry of "cycle_offset", which will be described later, and when the value of this field reaches 8000, it is carried up and reset to 0. When this field is reset, the value of "second_count" field is incremented.

"Cycle_offset" is a field representing an offset in a cycle counted at a clock of 24.576 MHz. This field is incremented by the clock of 24.576 MHz and when the value reaches 3072, it is carried up and reset to 0. When this field is reset, "cycle_count" field is incremented. The offset in the third field is delay information from the reference start time of the cycle.

Each node repeats all the packets including the received cycle start packet to ports other than a reception port, with an almost constant repeat delay time. Thus, the packets are transmitted to all the nodes. Each node updates contents of a cycle time register of the node itself, by the time information contained in the received cycle start packet. This enables synchronization of the entire bus. This will be described with reference to FIGS. 3 and 4.

In the following description, three nodes 100a (node A), 100b (node B) and 100c (node C) are daisy-chain-connected using an IEEE 1394 bus 101, as shown in FIG. 3. Internal configurations of the nodes are identical. Therefore, these nodes may sometimes be generally referred to a node 100.

In the example shown in FIG. 3, it is assumed that node A is the cycle master node.

Referring to FIG. 4, each node 100 has a physical layer controller 110 and a link layer controller 120. A node which performs a repeat process only, which will be described later, may have the physical layer controller only.

Physical layer controller 110 has at least one port 111 for exchanging data over bus 101. Physical layer controller 110 includes a reception data bus 12 for propagating data received at port 111, a transmission data bus 13 for propagating data to be transmitted from port 111, a resynchronization unit 14 for synchronizing received data with a local clock, and a link layer I/F 15 which is an interface with link layer controller 120.

Link layer controller 120 includes a cycle time register 121, and a physical layer I/F 122 which is an interface with physical layer controller 110.

In a state where the cycle start packet is to be transmitted, node A (100a) as the cycle master node issues a transmission request to IEEE 1394 bus. When transmission is enabled, the cycle start packet including the contents of cycle time register 121 of node A (100a) as the cycle master node is formed by link layer controller 120, and transmitted through physical layer I/F 122 in link layer controller 120, link layer 1/F 15 in physical layer controller 110, transmission data bus 13 and port 111. Nothing is transmitted from port 111 which is not connected to anywhere.

Node B (100b) connected to cycle master node (node A) by the IEEE 1394 bus applies the packet data received from port 111 through reception data bus 12 to resynchronization unit 14. The received packet data is re-synchronized with the local clock of node B at resynchronization unit 14, and transmitted through the transmission data bus 13 from port 111 other than the port which has received the data. This is the process referred to as "repeat."

In parallel with the repeat process, node B (100b) transmits the re-synchronized packet data to link layer controller 120 through link layer I/F 15 and physical layer I/F 122. When the packet is the cycle start packet, a value of cycle time register 121 in link layer controller 120 is updated by the value of "cycle_time" field contained therein.

Node C (100c) connected to node B (100b) by the IEEE 1394 bus rewrites the value of cycle time register 121 in link layer controller 120, by the value of the "cycle_time" field contained in the cycle start packet which has been re-synchronized with the local clock at node C (100c), similar to node B (100b). In the example of FIG. 3, there is not the port 111 which is connected to anywhere other than the port 111 which has received the data at node C, and therefore, repeat process does not take place.

By the above described operation, the three nodes (100a, 100b and 100c) can be synchronized.

Though there are three nodes in the example of FIG. 3, larger number of nodes may be connected. Such an example may be considered as having a plurality of nodes corresponding to node B (100b) connected in a longer daisy chain. Alternatively, or in addition, nodes corresponding to node A or node B may have a plurality of transmission destination (repeat destination) ports and in star connection.

Another prior art example includes an IEEE 1394 bridge connecting two IEEE 1394 buses, which is discussed for standardization by P1394.1, one of Standards Committees of IEEE. In IEEE 1394 bridge, a scheme has been considered in which a cycle start packet of one bus is generated based on time information contained in the cycle start packet of the other bus, so as to attain synchronization between the two buses connected thereto.

FIG. 5 shows an example of the IEEE 1394 bridge. Referring to FIG. 5, a bridge 200 as an example of IEEE 1394 bridge includes physical layer controllers 110, 110' and link layer controllers 120, 120' provided corresponding to bus 201 (bus A) and bus 201' (bus B) as IEEE 1394 buses connected thereto, respectively, as well as a bridge controller 210 connected to the two link layer controllers 120 and 120'.

The two physical layer controllers 110 and 110' receives, among the packet data flowing over connected buses 201 and 201' respectively, those addressed to themselves or nodes addressed to all the nodes connected to buses 201 and 201', and pass the received packet data to link layer controllers 110 and 110' connected thereto. Further, physical layer controllers 110 and 110' transmit packet data of which transmission is indicated by link layer controllers 120, 120', to buses 201 and 201', respectively.

Two link layer controllers 120 and 120' transmit the received data from the buses received through physical layer controllers 110 and 110' connected thereto, respectively, to bridge controller 210. Link layer controllers 120 and 120' instructs physical layer controllers 110 and 110' to transmit the data transmitted from bridge controller 210 to the buses. Link layer controller 120 or 120' which is connected to a bus where the bridge 200 is the cycle master node generates the cycle start packet, and indicates transmission of the cycle start packet to the connected physical layer controller 110 or 110'.

Bridge controller 210 determines whether the repeat to the other bus should be performed or not, in accordance with bus information of the destination of the receive packet. When repeating is to be done, bridge controller 210 issues a command to transmit the packet to be repeated, to the link layer controller. The cycle start packet is not repeated by the bridge controller.

Different from the first prior art example, in bridge 200, the cycle time register holding time information of the bus is not provided in each of the two link layer controllers 120 and 120' but one common cycle time register is used.

Here, it is assumed that the cycle start packet is received from the side of bus A(201), and the cycle start packet is generated and output to the side of bus B(201)'. Naturally, on the side of bus B, bridge 200 serves as the cycle master node.

Link layer controller 120 connected to bus A updates the cycle time register in accordance with the contents of the cycle start packet.

Link layer controller 120' connected to bus B generates the cycle start packet by reading the contents of the cycle time register, and transmits the generated packet to bus B.

It is possible that a cycle start packet is not received but the cycle start packet is transmitted to both buses. It occurs when buses A and B are performing the same process. In this case, bridge 200 is referred to as a bus cycle master node.

When it is unnecessary for bus A or bus B or both connected to bridge 200 to handle a synchronization packet referred to as an isochronous packet, the bridge may not receive or transmit the cycle start packet.

However, half duplex transmission (ping-pong transmission) is not possible in accordance with IEEE Std 1394-1995, P1394a and P1394b.

Transmission of signals in accordance with IEEE 1394 using half duplex transmission (ping-pong transmission) may be considered. In that case, however, repeat delay at each node is not constant. Therefore, simple repeating may cause mismatch of time information among nodes on the bus. This problem will be described with reference to FIGS. 6 to 8.

FIG. 6 represents packet timings in the link layer controller on the cycle start packet transmitting side (cycle master node).

Referring to FIG. 6, delay time x from a reference of a cycle when the cycle start packet is transmitted (that is, the time point at which cycle offset of cycle timer of the cycle master node is 0) is transmitted, contained in the cycle start packet.

FIG. 7 represents packet timings in the link layer controller on the cycle start packet receiving side, when IEEE 1394 is used as the transmission medium.

Referring to FIG. 7, delay time δ 0 at the time of transmission and reception is almost constant. Therefore, updating of local time information using the time information contained in the received cycle start packet causes no mismatch.

FIG. 8 represents packet timings in the link layer controller on the cycle start packet receiving side, when a half duplex transmission medium is used as the transmission medium. In the figure, the delay time δ 0 represents the total delay time at transmission and reception, at the nodes between the transmitting and receiving sides (including the transmitting node and the receiving node themselves).

Here, though the delay time is almost constant at the time of reception, the delay time is not constant for transmission. Therefore, when the local time information is updated using the time information contained in the received cycle start packet, time mismatch results. The delay times δ 1 and δ 2 represent the total of delay times for transmission and reception, similar to delay time δ 0. More specifically, because of the variation in the transmission delay time, the time may considerably be advanced or lagged behind, when the local time is updated on the receiving side. The variation in the transmission delay time experienced here is a few microseconds.

As the time is considerably advanced or lagged behind, synchronization between nodes may possibly be unsatisfactory, and isochronous (synchronized) data handling, which is on the premise that the nodes are in synchronization, may be difficult.

When a bridge is used, the cycle start packet is not repeated but a new cycle start packet is generated. Therefore, there is not the problem of mismatch in time information between buses. The bridge configuration, however, is complicated as shown in FIG. 5, and implementation of the bridge increases the circuit scale. Further, as there are two or more divided buses involved, a mechanism for passing packets to and from nodes on different buses over the bridge becomes necessary.

SUMMARY OF THE INVENTION

Therefore, an object of the present invention is to provide a method of half duplex transmission transmitting packetized digital data which can be realized in a simple and small scale circuit without causing time information mismatch among buses.

Another object of the present invention is to provide a method of half duplex transmission transmitting packetized digital data implemented by a simple and small scale circuit using a small amount of information without causing time information mismatch among buses.

A still further object of the present invention is to provide a method of half duplex transmission transmitting packetized digital data implemented by a simple and small scale circuit without causing time information mismatch on a serial bus.

An additional object of the present invention is to provide a method of half duplex transmission transmitting packetized digital data implemented by a simple and small scale circuit with a small amount of information, without causing time information mismatch.

The present invention provides a method of half duplex transmission of packetized digital data from an electronic device to another node through a bus connected to the electronic device. The electronic device has at least one transmitting/receiving unit for transmitting and receiving a packet on the bus. The method includes the steps of: inputting a new packet to be transmitted to a first-in-first-out storage; determining whether the new packet input to the first-in-first-out storage contains time information related to synchronization with another electronic device; updating a local timer of the electronic device with a prescribed value in response to determination that the new packet contains time information; continuously incrementing the local timer; in response to a timing enabling transmission of the new packet by the transmitting/receiving unit, reading the new packet from the first-in-first-out storage, determining whether the new packet contains time information or not, updating the time information contained in the new packet by using a local timer value so as to prevent mismatch of synchronization with another electronic device, and outputting the new packet to the bus through the transmitting/receiving unit.

When the new packet containing the time information is to be transmitted, the local timer is updated using the time information of the packet, and the local timer is continuously incremented. At the time of actual output, the time information contained in the packet to be transmitted is rewritten by using the value of the local timer, and therefore time synchronization mismatch with the other electronic device can be prevented even in the half duplex transmission. Further, the circuit used therefor may be a simple, small scale circuit.

Preferably, information length of the local timer is equal to the information length of the time information, and the step of updating includes the step of rewriting the local timer with the time information of the new packet in response to the determination that the new packet contains time information.

More preferably, the information length of the local timer is shorter than the length of the time information, and the step of updating the step of rewriting the local timer with lower information of the time information of the new packet, in response to the determination that the new packet contains time information.

More preferably, the step of updating includes the step of rewriting the local timer value to a predetermined constant, for example, 0, in response to the determination that the new packet contains time information. The step of outputting includes the step of reading, in response to the timing enabling transmission of the new packet by the transmitting/receiving unit, the new packet from the first-in-first-out storage, determining whether the new packet contains time information or not, adding an addition value of the local timer rewritten by the step of rewriting to the time information contained in the new packet so as to rewrite the time information contained in the new packet, and outputting the packet to the bus through the transmitting/receiving unit.

According to another aspect, the present invention provides a half duplex transmission apparatus for half duplex transmission of packetized digital data from an electronic device to another node through bus connected to the electronic device, and the electronic device has at least one transmitting/receiving unit for transmitting/receiving the packet on the bus. The apparatus includes: a first-in-first-out storage connected to receive the new packet to be transmitted; a local timer updated with a prescribed value when the new packet input to the first-in-first-out storage contains time information related to synchronization with another electronic device and counted up with a prescribed clock signal; and a packet rewriting unit responsive to the timing enabling transmission of the new packet by the transmitting/receiving unit, reading the new packet from the first-in-first-out storage, determining whether the new packet contains time information or not, changing the time information contained in the new packet by using the local timer value, and outputting the packet to the bus through the transmitting/receiving unit.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 represents data configuration of the cycle time register.

FIG. 6 represents cycle timings on the link layer controller on the transmitting side.

FIG. 7 represents packet timings in the link layer controller on the receiving side when IEEE1394 is used.

FIG. 8 represents packet timings in the link layer controller on the receiving side when half duplex transmission medium is used.

FIG. 14 is a flow chart representing the process of rewriting the cycle start packet in accordance with a second embodiment of the present invention.

DETAILED DESCRIPTION OF THE PREFERRED EMBODIMENTS

First Embodiment

Figure 9:
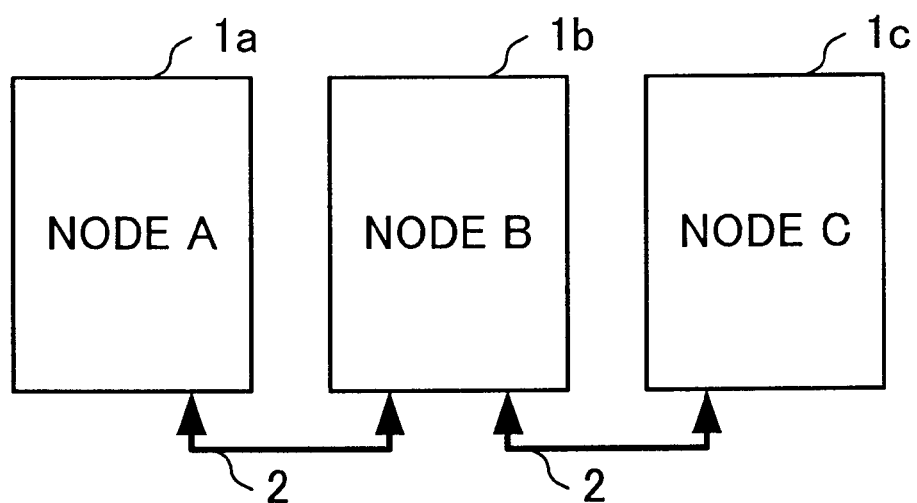
FIG. 9 is a block diagram of a system in which electronic devices are daisy-chain-connected, in accordance with an embodiment of the present invention.

FIG. 9 is a block diagram representing a system including a plurality of nodes 1*a* to 1*c* connected to a bus, in accordance with the method and apparatus of half duplex transmission in accordance with the present invention.

An electronic device which is a half duplex transmission device capable of handling signals in accordance with IEEE1394 by half duplex transmission contains at least one node supporting half-duplex transmission medium. Nodes 1*a*, 1*b* and 1*c* shown in FIG. 9 represent nodes supporting half duplex transmission medium capable of handling signals in accordance with IEEE1394 by half duplex transmission, having identical internal configurations. These nodes may sometimes be referred generally as node 1.

Nodes 1*a* and 1*b* as well as nodes 1*b* and 1*c* are coupled by half duplex transmission medium 2, respectively. An optical fiber, infrared communication and wireless communication are not limiting examples of half duplex transmission medium 2. As nodes 1*a*, 1*b* and 1*c* have substantially the same internal configurations, only the node 1*a* will be described in the following.

Figure 10:
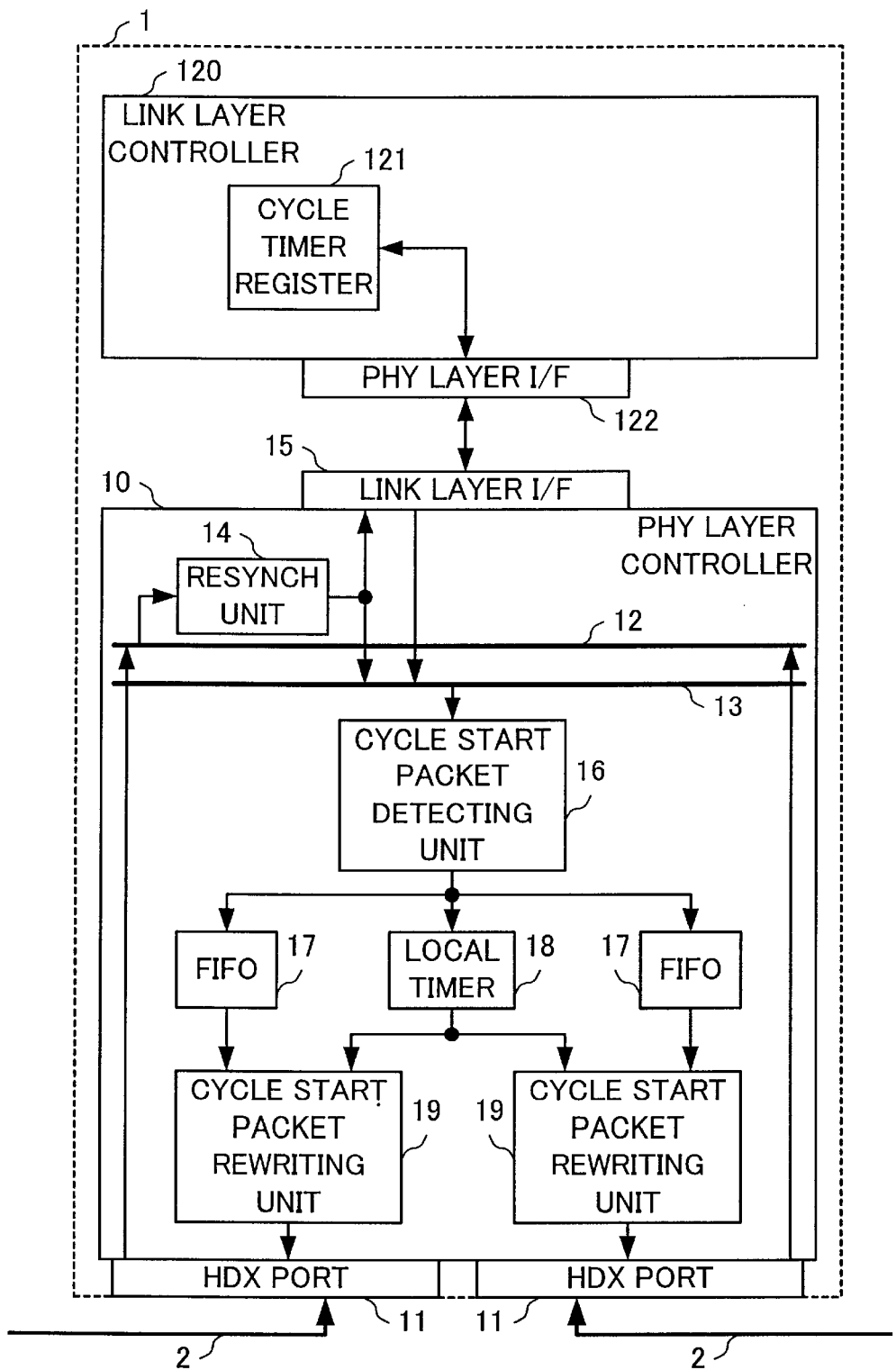
FIG. 10 is a block diagram of an electronic device in accordance with one embodiment of the present invention.

Referring to FIG. 10, the node 1 supporting half duplex transmission medium includes a physical layer controller 10 and a link layer control 120 supporting half duplex transmission. These two controllers 10 and 120 may physically be implemented in two or more LSIs or other components, or may be incorporated in one LSI.

Figure 4:
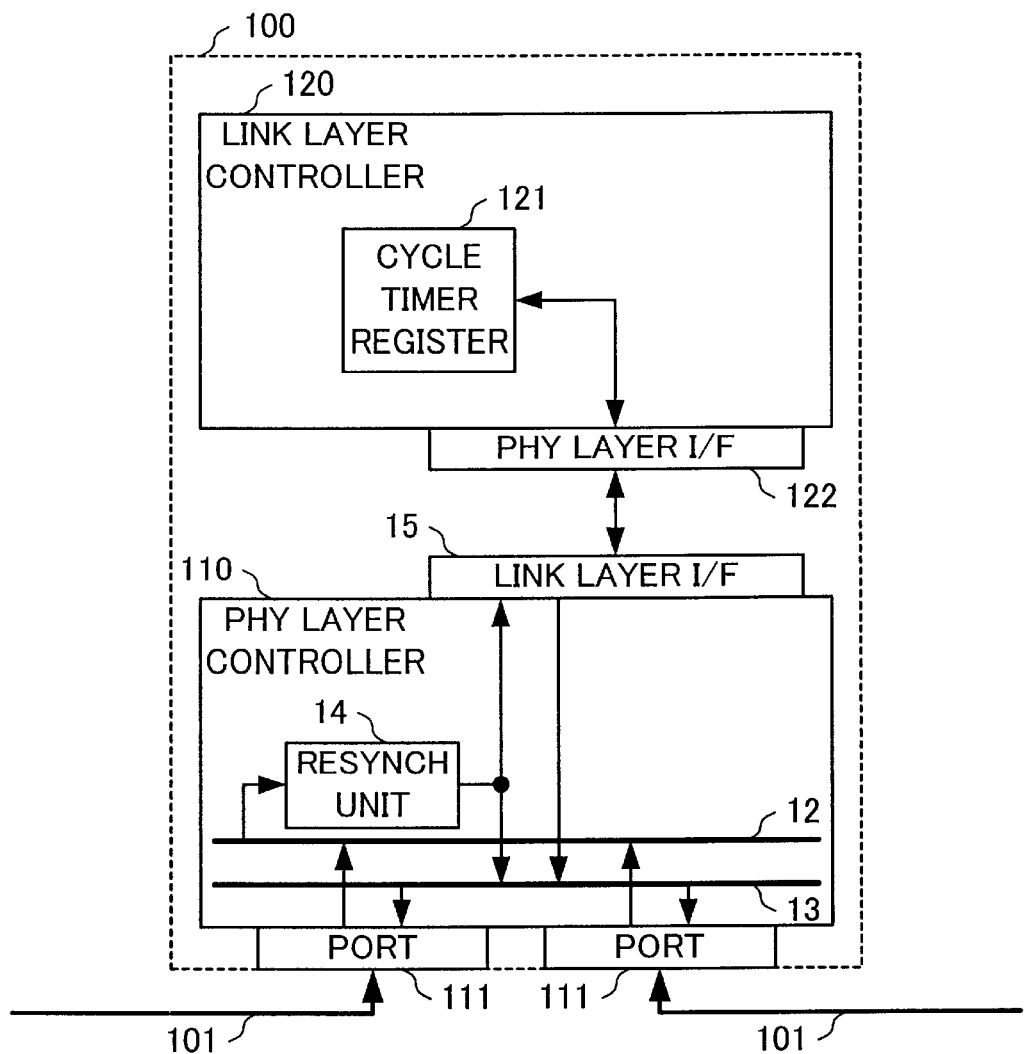
FIG. 4 is a block diagram representing a node configuration shown in FIG. 3.
Figure 5:
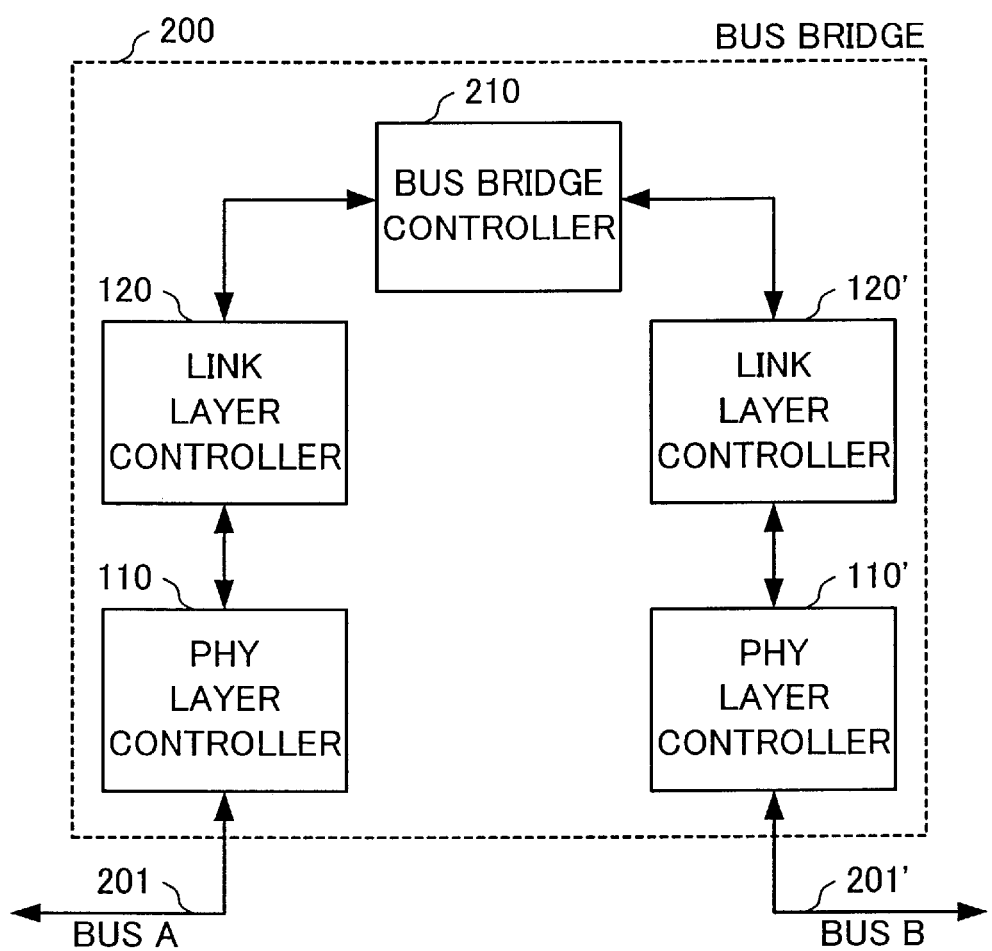
FIG. 5 is a block diagram representing a schematic configuration of a conventional IEEE1394 bridge.

Link layer controller 120 is the same as link layer controller 120 shown in the prior art of FIG. 4. Therefore, detailed description thereof will not be repeated here.

Physical layer controller 10 supporting half duplex transmission medium includes half duplex transmission ports 11, a reception data bus 12 carrying the received data, a transmission data bus 13 carrying the data to be transmitted, a packet data resynchronization unit 14 for attaining synchronization of the received packet data with an internal clock signal, a link layer I/F 15 as an interface with the link layer controller, a cycle start packet detecting unit 16 for detecting the cycle start packet, a transmission data FIFO 17 temporarily buffering and outputting the transmitted data in first-in-first-out manner, a local timer 18, and a cycle start packet rewriting unit 19 for rewriting the cycle start packet in the manner as will be described in the following.

Half duplex transmission port 11 is connected through half duplex transmission medium 2 to a half duplex transmission port 11 of another physical layer controller 10 supporting half duplex transmission. Port 11 outputs a packet data transmitted from a counterpart port 11 to reception data bus 12, and transmits a packet data to be transmitted input from cycle start packet rewriting unit 19 to the counterpart port 11.

Reception data bus 12 is for carrying the packet data received by any of the half duplex transmission ports 11, to packet data resynchronization unit 14.

Transmission data bus 13 is for carrying the packet data output from packet data resynchronization unit 14 or from link layer I/F 15 to cycle start packet detecting unit 16.

Packet data resynchronization unit 14 resynchronizes the received packet data input from reception data bus 12 with a local clock within the device. This is to eliminate the influence of subtle difference in clock frequencies of the device which transmitted the packet data and the device which received the packet data (that is, the device itself). The resynchronized received packet data is output to transmission data bus 13 and link layer I/F 15.

Link layer I/F 15 is for outputting the received packet data from physical layer controller 10 to link layer controller 120 and for inputting the packet data to be transmitted from link layer controller 120 to physical layer controller 10.

Figure 1:
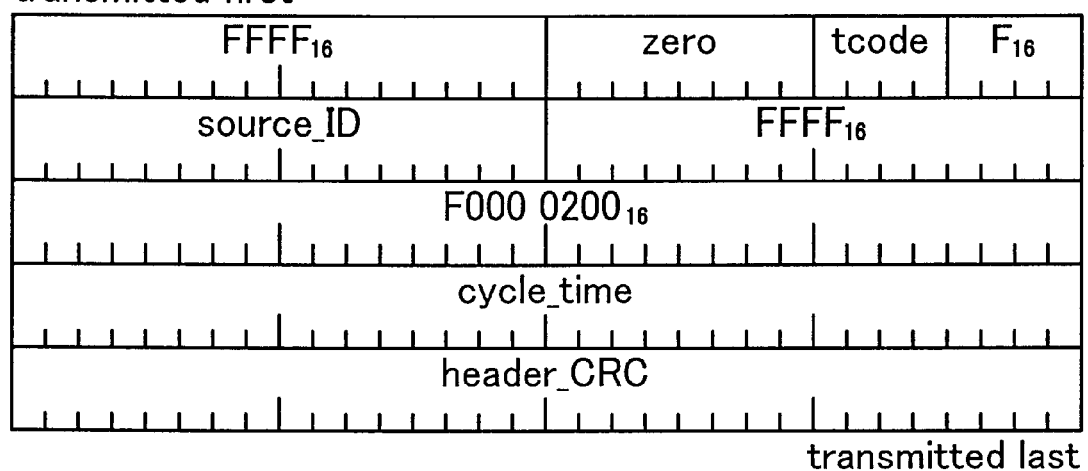
FIG. 1 represents data configuration of the cycle start packet used in half duplex transmission.
Figure 3:
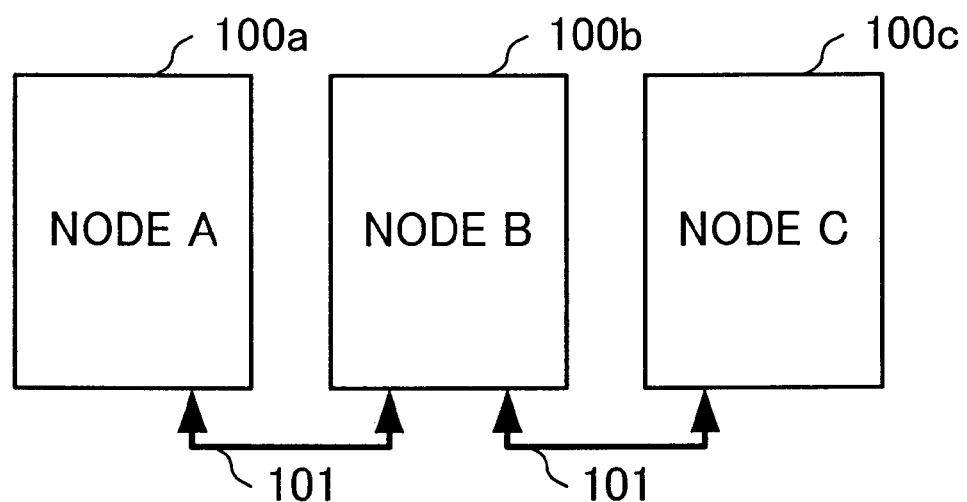
FIG. 3 is a block diagram of a conventional system including a plurality of nodes connected to an IEEE1394 bus.

Cycle start packet detecting unit 16 determines whether the packet data to be transmitted, input through transmission data bus 13, for transmission from half duplex transmission port 11 is possibly be the cycle start packet shown in FIG. 1. Cycle start packet detecting unit 16 outputs the transmission packet data with a flag indicating the result of determination added to transmission data FIFO 17 and to local timer 18.

Figure 11:
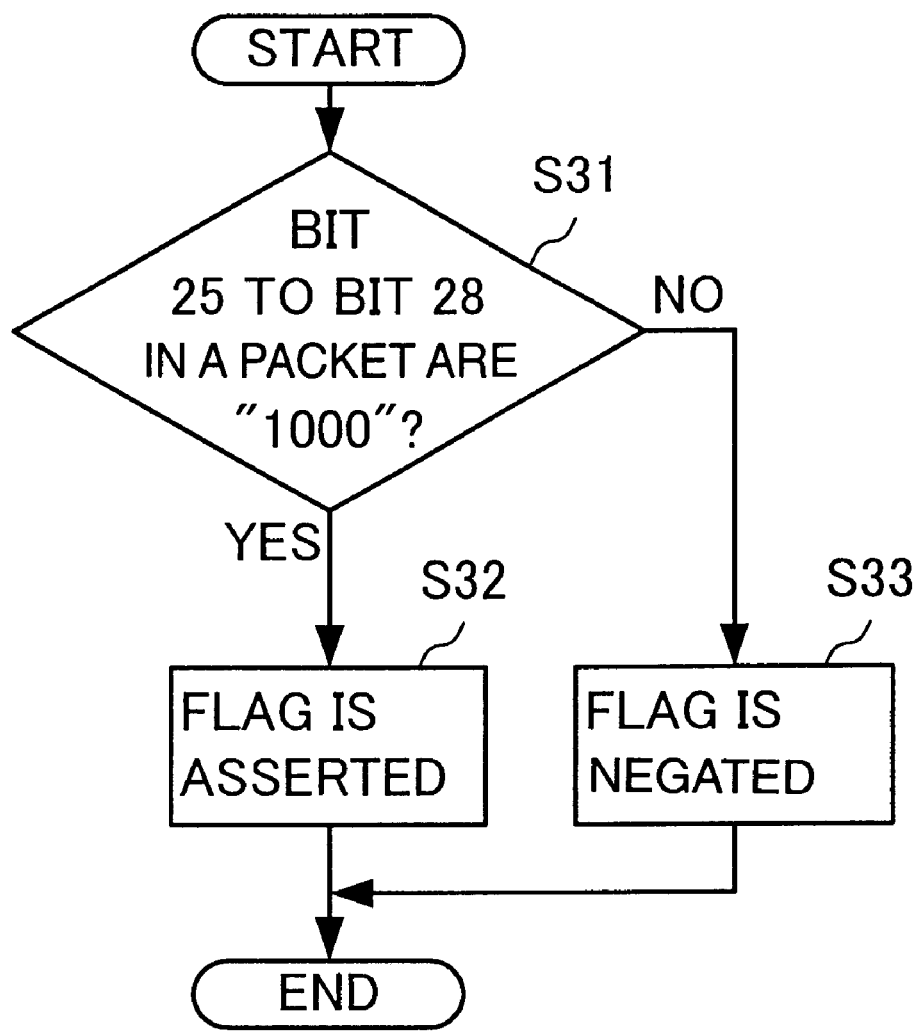
FIG. 11 is a flow chart representing the process for determining a cycle start packet in the half duplex method in accordance with one embodiment of the present invention.

FIG. 11 is the flow chart representing the process for determining whether the transmission packet data is possibly be a cycle start packet or not.

The process in accordance with the flow chart starts every time the transmission packet data is input to cycle start packet detecting unit 16.

In step S31, whether the value from bit 25 to bit 28 from the head of the packet are "1000" is determined. When the value is "1000", the flow proceeds to step S32, and otherwise, proceeds to step S33. Bits 25 to 28 from the head of the packet used for determination correspond to tcode field of the cycle start packet shown in FIG. 1, and when it is the cycle start packet, the value is "1000".

In step S32, a flag is asserted indicating that the transmitted data packet may possibly be a cycle start packet.

In step S33, the flag is not asserted as the transmitted data packet is not a cycle start packet, and the process ends.

Transmission data FIFO 17 is an FIFO (First-In-First-Out memory) for adjusting output timing of the transmission packet data to be timed with the transmission timing from the apparatus itself, which is the half duplex transmission apparatus.

The data is input from cycle start packet detecting unit 16 to FIFO 17, and output timed with the packet transmission timing. The output data is transmitted to cycle start packet rewriting unit 19. FIFO 17 must have capacity large enough to store maximum data amount possibly transmitted over half duplex transmission medium 2 in a maximum delay time experienced during half duplex transmission.

Local timer 18 is for holding time information to rewrite the cycle start packet. It is the same type as the cycle time register shown in FIG. 2. More specifically, the local timer 18 includes "second_count" of 7 bits, "cycle_count" of 13 bits and "cycle_offset" of 12 bits.

Figure 12:
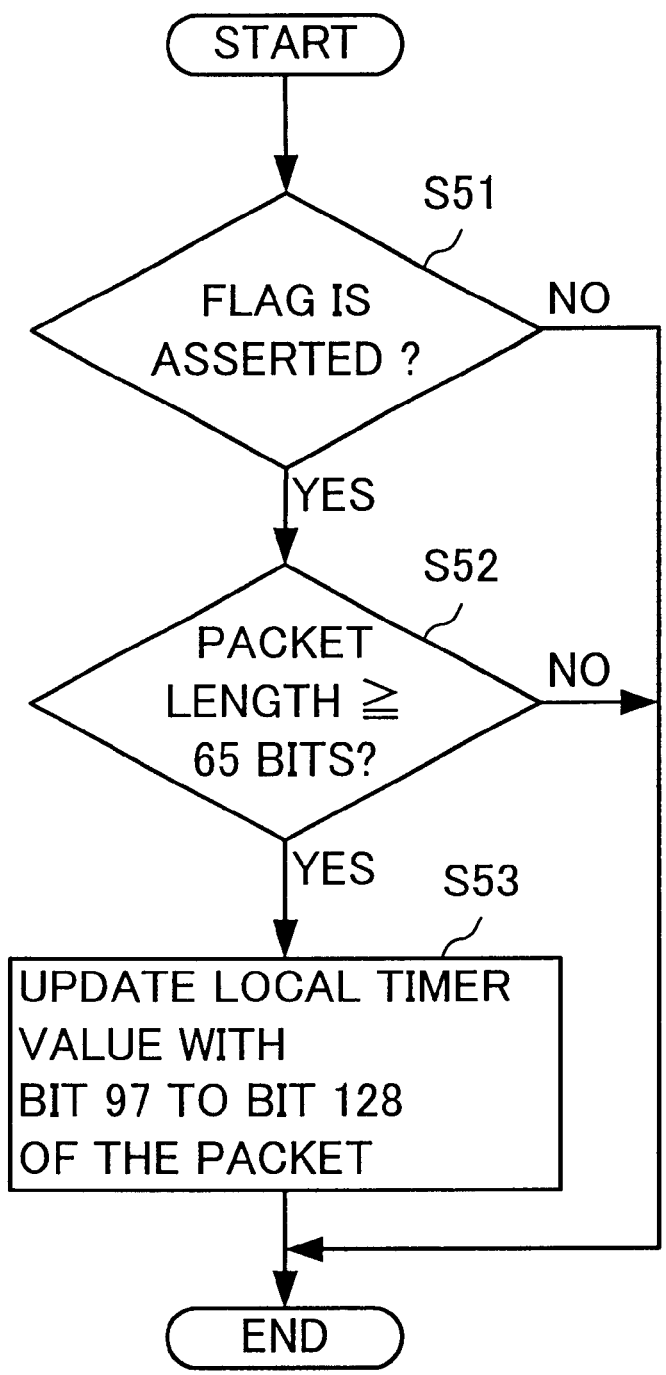
FIG. 12 is a flow chart representing the process for updating a local timer in accordance with one embodiment of the present invention.

As already described with reference to FIG. 4, "cycle_offset" is incremented by the clock of 24.576 MHz, and when the count reaches 3072, it is carried up and reset to 0. "Cycle_count" is carried up and reset at 8000. Local timer 18 is updated based on the transmission packet data to which the flag information from cycle start packet detecting unit 16 is added. FIG. 12 is the flow chart of this process.

The process in accordance with the flow chart start every time the transmission packet data is input to local timer 18.

In step S51, whether the flag added by cycle start packet detecting unit 16 is asserted or not is determined. If the flag is asserted, the packet may possibly be a cycle start packet, and therefore, the flow proceeds to step S52. If the flag is not asserted, the packet is not a cycle start packet, and hence the process ends here.

In step S52, whether the packet length of the transmission packet data is at least 65 bits is determined. If the length is at least 65 bits, the packet is determined to be a cycle start packet and the flow proceeds to step S52. If not, the packet is not a cycle start packet, and hence the process ends here.

In step S53, the value of the local timer is updated using the value of bit 97 to bit 128 from the head of the packet, and the process ends. Bits 97 to 128 from the head of the cycle start packet correspond to "cycle_time" field, as shown in FIG. 1.

The value of local timer 18 is output to cycle start packet rewriting unit 19.

Cycle start packet rewriting unit 19 outputs the transmission packet data with the flag indicating whether it may possibly be a cycle start packet output from transmission FIFO 17 as well as the transmission packet data of which time information of the cycle start packet rewritten based on the value of the local timer output from local timer 18, to half duplex transmission port 11.

The portion where rewriting is necessary within the cycle start packet is the "cycle_time" field on the fourth stage and "header_CRC" field on the fifth stage of the cycle start packet shown in FIG. 1.

Figure 13:
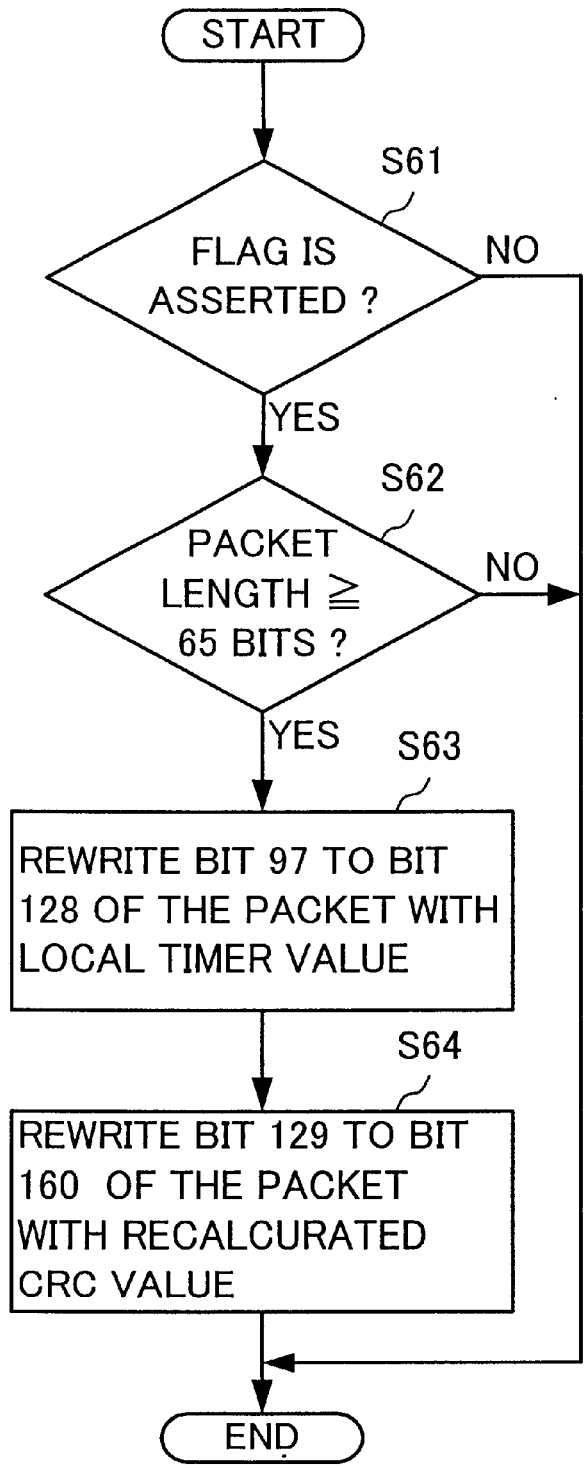
FIG. 13 is a flow chart showing the process of rewriting the cycle start packet in accordance with one embodiment of the present invention.

FIG. 13 is a flow chart of the process for rewriting the cycle start packet.

The process in accordance with the flow chart starts every time the transmission packet data is input to cycle start packet rewriting unit 19.

In step S61, whether the flag added by cycle start packet detecting unit 16 is asserted or not is determined. If the flag is asserted, the packet may possible be a cycle start packet, and therefore the flow proceeds to step S62. If the flag is not asserted, it is not the cycle start packet, and hence the process ends.

In step S62, whether the packet length of the transmission packet data is at least 65 bits is determined. If the packet length is at least 65 bits, it is determined to be a cycle start packet, and the flow proceeds to step S63. If not, it is not a cycle start packet, and hence the process ends.

In step S63, the value of bit 97 to 128 from the head of the packet are rewritten by the value of local timer 18, and the flow proceeds to step S64. In step S64, the value from bit 129 to bit 160 from the head of the packet is rewritten by the value of re-calculated CRC.

By the present embodiment, it becomes possible to eliminate mismatch of time information between nodes resulting from half duplex transmission.

This can be seen from FIG. 14. The cycle start packet generated by the link layer controller on the transmitting side of FIG. 6 has the delay time not constant, when transmitted from the half duplex port. In the present embodiment, however, the time information contained in the cycle start packet is corrected (rewritten) by a proper information at the time of transmission. Therefore, mismatch in time information does not result in the link layer controller 120 of the receiving side, as shown in FIG. 14. Even when there are some repeat nodes between the transmitting and receiving nodes, correction (rewriting) of the cycle start packet is performed at every repeat processing, and hence mismatch of time information is not experienced in the link layer controller 120 of the receiving side.

Second Embodiment

The present embodiment relates to reduction in amount of information of a correction value for the time information in accordance with the present invention. Portions other than the local timer 18 and the packet rewriting unit 19 are the same as those in the first embodiment. Therefore, detailed description thereof will now be repeated here.

The time delay by half duplex transmission is about a few microseconds at the longest. Therefore, within the time frame handled by the cycle time register shown in FIG. 2, the delay will never be in the order of seconds or cycles (125 micro seconds). Therefore, only the portion of the offset unit may be corrected.

Figure 15:
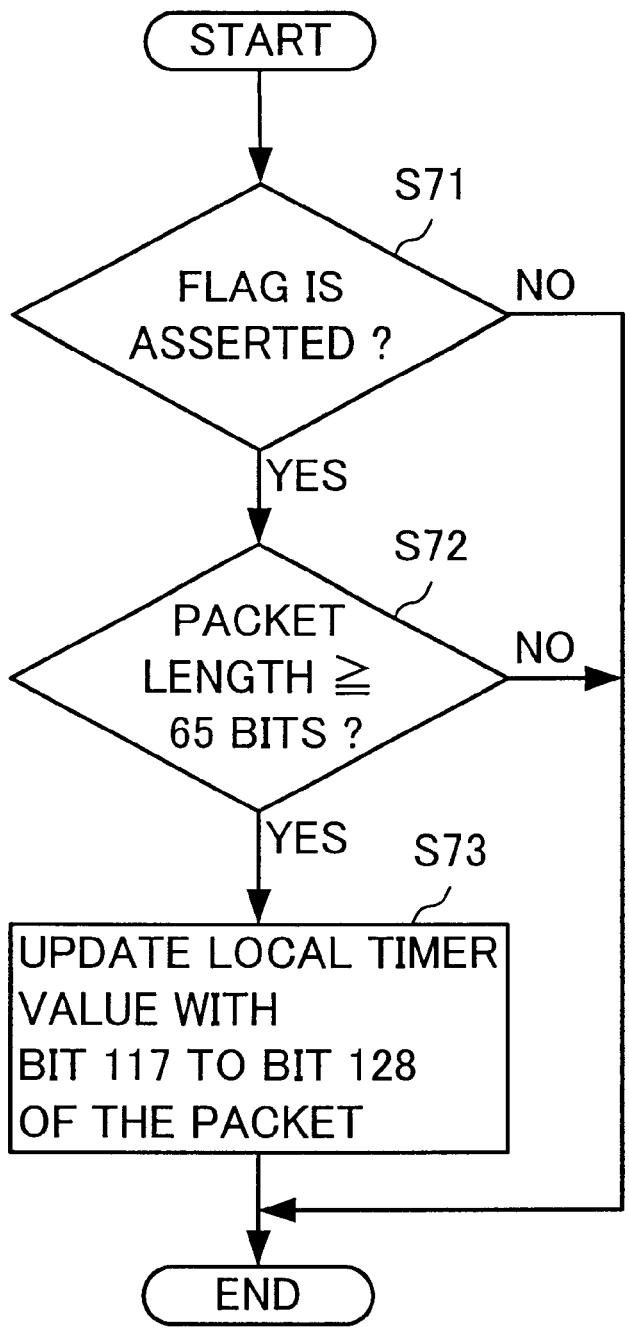
FIG. 15 is a block diagram representing the process for resetting the local timer in accordance with the second embodiment of the present invention.

The local timer 18 have only to handle the offset portion, that is, the lower 12 bits of the cycle time. The flow charts of the process here is as shown in FIG. 15.

The process in accordance with the flow chart start every time a transmission packet data is input to local timer 18.

In step S71, whether the flag added by cycle start packet detecting unit 16 is asserted or not is determined. If the flag is asserted, the packet may possibly be a cycle start packet, and the flow proceeds to step S72. If the flag is not asserted, the packet is not a cycle start packet, and the process ends.

In step S72, whether the packet length of the transmission packet data is at least 65 bits is determined. If it is at least 65 bits, the packet is determined to be a cycle start packet, and the flow proceeds to step S73. If not, the packet is not a cycle start packet, and the process ends.

In step S73, the value of local timer 18 is updated by the value of bit 117 to bit 178 from the head of the packet, and the process ends. Bits 117 to 128 from the head of the cycle start packet correspond to lower 12 bits of "cycle_time" field as shown in FIG. 1, and corresponding to "cycle_offset" field of the cycle time register shown in FIG. 2.

The process at the packet rewriting unit 19 is the same as that of the first embodiment except that the portion which requires rewriting is only the "cycle_offset" field of "cycle_time" field and "header_CRC" field.

By the present embodiment, it becomes possible to reduce the necessary number of bits of the local timer.

Third Embodiment

The present embodiment relates to counting of delay time. Portions other than the local timer 18 and the packet regarding unit 19 of the apparatus of the present embodiment are the same as those of the first embodiment. Therefore, detailed description thereof is not repeated here.

The effects similar to those obtained by the first and second embodiments can also be obtained by counting delay time (deviation) caused by half duplex transmission and by correcting the deviation at the time of transmission.

Figure 16:
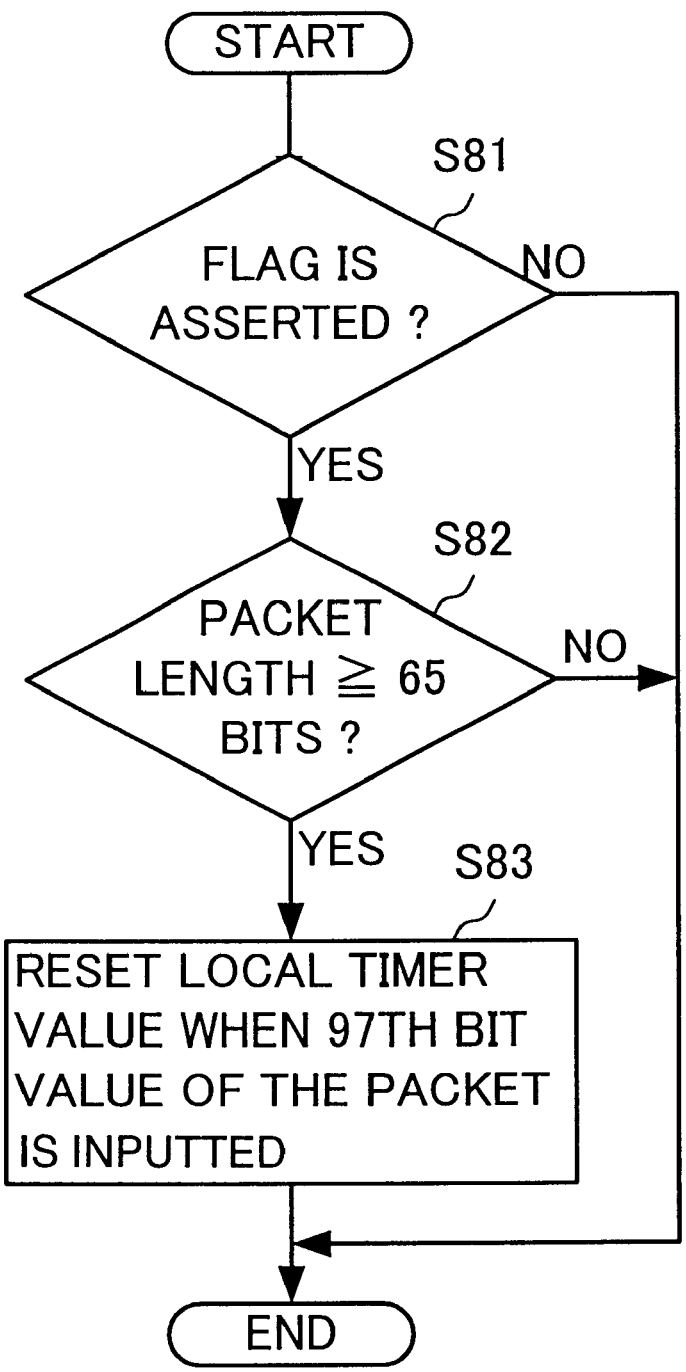
FIG. 16 is a block diagram representing the process for resetting the local timer in accordance with a third embodiment of the present invention.

The delay time experienced by the half duplex transmission is about a few microseconds at the longest. Therefore, a local timer 18 of 8 bits or 9 bits may be sufficient. In the first and second embodiments, when a packet is determined to be a cycle start packet, the value of the local timer is updated by the cycle time contained in the cycle start packet. In the present embodiment, the timer is reset to 0 at the same timing. FIG. 16 is the flow chart of this process.

The process in accordance with the flow chart starts every time a transmission packet data is input to local timer 18.

In step S81, whether the flag added by cycle start packet detecting unit 16 is asserted or not is determined. If the flag is asserted, the packet may possibly be a cycle start packet, and the flow proceeds to step S82. If the flag is not asserted, it is not a cycle start packet, and hence the process ends.

In step S82, whether the packet length of the transmission packet data is at least 65 bits is determined. If it is at least 65 bits, the packet is determined to be a cycle start packet, and the flow proceeds to step S83. If not, the packet is not a cycle start packet, and the process ends.

In step S83, at a time point when bit 97 from the head of the packet is input, local timer 18 is reset, and the process ends. Bit 97 from the head of the cycle start packet corresponds to the head bit of "cycle_time" field, as shown in FIG. 1.

In the present embodiment, the timing for resetting the timer to 0 is bit 97 from the head of the packet. The timer may be reset, however, at any timing provided that it is a definite timing after the packet is determined to be the cycle start packet until the cycle offset portion of the cycle time is input.

Cycle start packet rewriting unit 19 outputs the transmission packet data with the flag indicating whether it may possibly be a cycle start packet output from transmission FIFO 17, together with the transmission packet data of which time information of the cycle start packet has been rewritten based on the value of the local timer output from local timer 18, to half duplex transmission portion 11.

Figure 17:
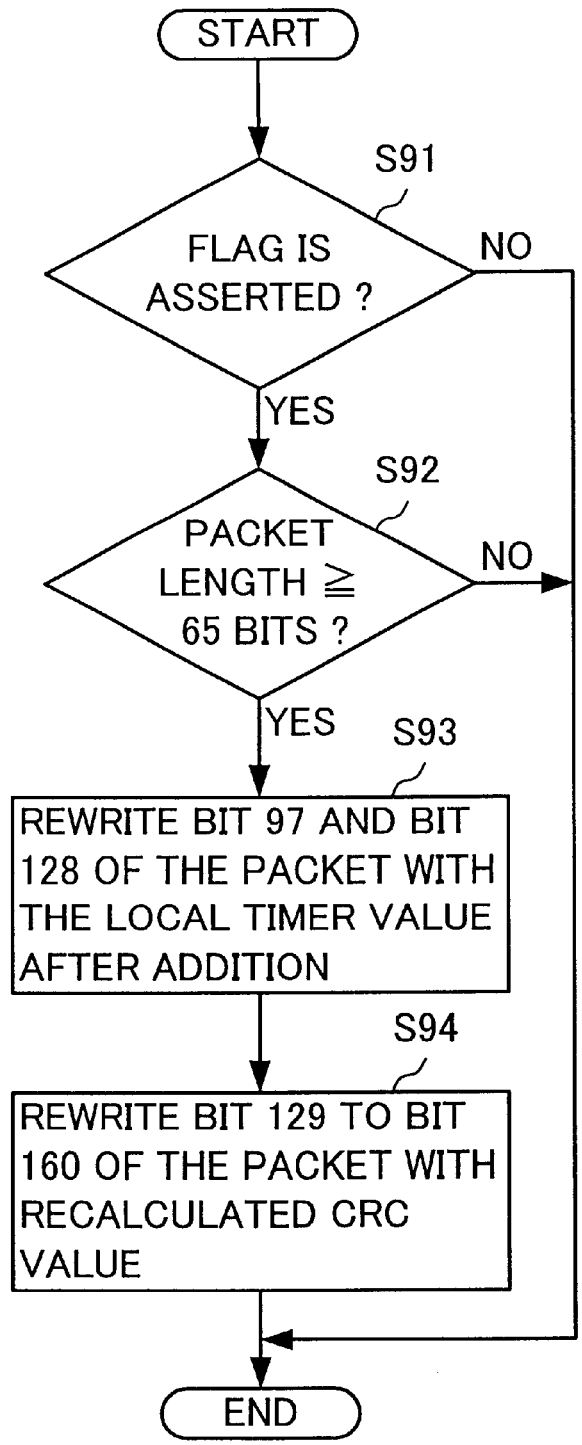
FIG. 17 is a flow chart representing the process for rewriting the cycle start packet in accordance with the third embodiment of the present invention.

The present embodiment differs from the first and second embodiments in that rewriting of "cycle_time" field is done not with the value of the local timer but with the result of addition of "cycle_time" before rewriting to the value of local timer. The flow chart of this process is as shown in FIG. 17.

The process in accordance with the flow chart starts every time a transmission packet data is input to cycle start packet rewriting unit 19.

In step S91, whether the flag added by cycle start packet detecting unit 16 is asserted or not is determined. If the flag is asserted, the packet may possible be a cycle start packet, and the flow proceeds to step S92. If the flag is not asserted, the packet is not a cycle start packet, and the process ends.

In step S92, whether the packet length of the transmission packet data is at least 65 bits is determined. If the packet length is at least 65 bits, the packet is determined to be a cycle start packet, and the flow proceeds to step S93. If not, the packet is not a cycle start packet, and the process ends.

In step S93, bits 97 to 128 of the packet are rewritten by the value obtained by adding the value of local timer 18 to the value of bits 97 to 128 bits from the head of the packet, and the flow proceeds to step S94.

In step S94, the value of bits 129th to 165 from the head of the packet are rewritten by a re-calculated CRC value.

According to this method, the cycle time in the packet is corrected by using a delay time (deviation) caused by half duplex transmission. By using the deviation, it becomes possible to correct time information contained in the packet other than the cycle start packet as well, in the similar manner. The packet other than the cycle start packet may include an isochronous packet. In the isochronous packet, the time stamp contained therein can be corrected in the similar manner as the cycle time. The difference from the process for the cycle start packet is only the timing of rewriting by the packet rewriting unit 19. The configuration for this variation is obvious to those skilled in the art. Therefore, detailed description will not be given here for simplicity.

According to the present invention, it becomes possible to reduce the number of necessary bits of the local timer, and to rewrite time information contained in a time information packet other than the cycle start packet.

In the first to third embodiments above, all the ports of the node are described as ports supporting half duplex transmission medium. Some of the ports of the node may be the ports defined in accordance with IEEE Std 1394-1995, P1394a or P1394b (draft) standard. The port defined by the conventional standard is connected through a transmission medium defined in accordance with the conventional standard, to a port defined by the conventional standard of another node.

As described above, in the present invention, in the method of half duplex transmission transmitting packetized digital data to a plurality of electronic devices connected by a bus, among transmission packet to be newly transmitted or packet received by a transmission/reception unit, a packet containing time information is detected. By the packet determined' to contain time information, a local timer is updated. When the packet is transmitted from the transmitting/receiving unit, the time information of the transmission packet is changed, using the updated value of the local timer. Thus, mismatch of time information among electronic devices can be eliminated.

Further, if the local timer is adapted to hold only the lower information of the time information, the amount of information can be reduced and the circuit scale can be made smaller.

The local timer may be reset by a reception packet containing time information, and the time information may be changed by adding the reset and counted value of the local timer to time information of the transmission packet when the packet is to be transmitted.

Further, the local timer may be reset by a transmission packet containing time information to be newly transmitted by the electronic device, and the time information of the transmission packet may be changed using the reset, and counted value of the local timer.

Further, when a serial bus in compliance with IEEE 1394 is used as the bus, connection to an electronic device in accordance with IEEE 1394 is used as the bus, connection to an electronic device in accordance with IEEE 1394 can readily be established.

Further, by correcting time information contained in the cycle start packet, it becomes possible to synchronize electronic devices, so as to correctly handle isochronous data in accordance with IEEE 1394.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of half duplex transmission of packetized digital data from a first node to a second node through a bus connected to said first node, said first node is a first electronic device, said second node is a second electronic device, said first node having at least one transmitting/receiving unit for transmitting/receiving a packet on said bus, said method comprising the steps of:

inputting a new packet to be transmitted to a first-in-first-out storage;

determining whether the new packet input to said first-in-first-out storage contains time information related to synchronization with said second node;

updating in response to determination that said new packet contains time information, a local timer of said first node;

continuously incrementing said local timer; and responsive to a timing enabling transmission of said new packet by said transmitting/receiving unit, reading said new packet from said first-in-first-out storage, determining whether said new packet contains said time information or not, updating said time information contained in said new packet by using a value of said local timer so as to prevent mismatch in synchronization with said second node, and outputting through said transmitting/receiving unit to the bus.

2. The method according to claim 1, wherein said step of determining includes the step of determining whether the new packet input to said first-in-first-out storage has a prescribed code at a prescribed position thereof.

3. The method according to claim 1, wherein information length of said local timer is equal to information length of said time information; and said step of updating includes the step, responsive to determination that said new packet contains time information, of rewriting said local timer with said time information of said new packet.

4. The method according to claim 3, wherein said step of determining includes the step of determining whether the new packet input to said first-in-first-out storage has a prescribed code at a prescribed position thereof.

5. The method according to claim 1, wherein information length of said local timer is shorter than information length of said time information, and said step of updating includes the step of rewriting, in response to determination that said new packet contains time information, said local timer with lower information of said time information of said new packet.

6. The method according to claim 5, wherein said step of determining includes the step of determining whether the new packet input to said first-in-first-out storage has a prescribed code at a prescribed position thereof.

7. The method according to claim 1, wherein said step of updating includes the step of rewriting, in response to determination that said new packet contains time information, the value of said local timer to a predetermined constant; and said step of outputting includes the step, responsive to a timing enabling transmission of said new packet by said transmitting/receiving unit, of reading said new packet from said first-in-first-out storage, determining whether said new packet contains said time information or not, rewriting said time information contained in said new packet by adding to said time information contained in said new packet, added value of said local timer after rewriting in said rewriting step, and outputting through said transmitting/receiving unit to the bus.

8. The method according to claim 7, wherein said step of updating includes the step of rewriting, in response to determination that said new packet contains time information, the value of said local timer to 0.

9. The method according to claim 7, wherein said step of determining includes the step of determining whether the new packet input to said first-in-first-out storage has a prescribed code at a prescribed position thereof.

10. The method according to claim 1, wherein said step of determining includes the step of determining whether the new packet input to said first-in-first-out storage contains time information related to synchronization with said second node, and setting or resetting a prescribed flag dependent on whether said new packet is determined to contain said time information or not;

said step of outputting includes the steps of reading, in response to timing enabling transmission of said new packet by said transmitting/receiving unit, said new packet from said first-in-first-out storage, and responsive to said prescribed flag being set, changing said time information contained in said new packet by using a value of said local timer to prevent mismatch of synchronization with said second node, and outputting through said transmitting/receiving unit to the bus.

11. The method according to claim 1, further comprising the step of receiving said new packet at one said transmitting/receiving unit; wherein said step of outputting includes the step of reading, in response to a timing enabling transmission of said new packet by said transmitting/receiving unit, said new packet from said first-in-first-out storage, determining whether said new packet contains said time information or not, changing said time information contained in said new packet by using a value of said local timer to prevent mismatch in synchronization with said second node, and outputting to said bus through one of said transmitting/receiving unit which is different from the one at which said new packet has been received.

12. A half duplex transmission apparatus for half duplex transmission of packetized digital data from a first node to a second node through a bus connected to said first node, said first node is a first electronic device and said second node is a second electronic device, said first node having at least one transmitting/receiving unit for transmitting/receiving the packet on said bus, said apparatus comprising:

a first-in-first-out storage connected to receive a new packet to be transmitted;

a local timer updated by a prescribed value when a new packet input to said first-in-first-out storage contains time information related to synchronization with said second node, and counted up with a prescribed clock signal; and a packet rewriting unit responsive to a timing enabling transmission of said new packet by said transmitting/receiving unit, reading said new packet from said first-in-first-out storage, determining whether said new packet contains said time information or not, changing said time information contained in said new packet by using a value of said local timer, and outputting to the bus through said transmitting/receiving unit.

13. The apparatus according to claim 12, wherein information length of said local timer is equal to information length of said time information, and said local timer is rewritten by said time information of said new packet in response to determination that said new packet contains time information.

14. The apparatus according to claim 13, wherein said local timer determines whether said new packet contains said time information or not dependent on whether the new packet input to said first-in-first-out storage has a prescribed code at a prescribed position thereof.

15. The apparatus according to claim 12, wherein information length of said local timer is shorter than information length of said time information, and said local timer is rewritten by lower information of said time information of said new packet, in response to determination that said new packet contains time information.

16. The apparatus according to claim 15, wherein said local timer determines whether said new packet contains said time information or not, by determining whether said packet input to said first-in-first-out storage has a prescribed code at a prescribed position thereof.

17. The apparatus according to claim 12, wherein said local timer is rewritten to a predetermined constant in response to determination that said new packet contains time information; and said packet rewriting unit includes a circuit, responsive to a timing enabling transmission of said new packet by said transmitting/receiving unit, reading said new packet from said first-in-first-out storage, determining whether said new packet contains said time information or not, rewriting said time information contained in said new packet by adding to said time information contained in said new packet, added value of said local timer after rewriting in said rewriting step, and outputting to the bus through said transmitting/receiving unit.

18. The apparatus according to claim 17, wherein said local timer determines whether said new packet contains said time information or not, by determining whether the new packet input to said first-in-first-out storage has a prescribed code at a prescribed position thereof.

19. The apparatus according to claim 17, wherein said local timer is reset to 0 by determining whether said new packet contains said time information, by determining whether the new packet input to said first-in-first-out storage has a prescribed code at a prescribed position thereof.

* * * * *